United States Patent [19]

Kawakami

[11] Patent Number: 5,055,949
[45] Date of Patent: Oct. 8, 1991

[54] DISK DRIVE AND METHOD FOR CONTROLLING THE CLEANING OF THE FLOPPY DISK

[75] Inventor: Chikahisa Kawakami, Fussa, Japan

[73] Assignee: Kabushiki Kaisha Toshiba, Kawasaki, Japan

[21] Appl. No.: 469,766

[22] Filed: Jan. 25, 1990

[30] Foreign Application Priority Data

Jan. 25, 1989 [JP] Japan .................. 1-15505

[51] Int. Cl.⁵ ............... G11B 15/18; G11B 17/00; G11B 19/02
[52] U.S. Cl. .................................. 360/71; 360/69; 360/74.1; 360/75
[58] Field of Search .............. 360/99.05, 69, 137, 360/74.1, 105, 71, 75

[56] References Cited

U.S. PATENT DOCUMENTS

| | | | |
|---|---|---|---|
| 4,445,155 | 4/1984 | Takahashi et al. | 360/99.05 |
| 4,541,025 | 9/1985 | Sidlu et al. | 360/99.05 |
| 4,625,247 | 11/1986 | Saito et al. | 360/71 X |
| 4,736,263 | 4/1988 | Takahashi | 360/99.05 |
| 4,839,757 | 6/1989 | Shigei et al. | 360/105 |

FOREIGN PATENT DOCUMENTS

| | | | |
|---|---|---|---|
| 61-160886 | 7/1986 | Japan | 360/133 |
| 63-4309 | 2/1988 | Japan . | |
| 63-41148 | 8/1988 | Japan . | |

Primary Examiner—A. J. Heinz
Assistant Examiner—Alfonso Garcia
Attorney, Agent, or Firm—Cushman, Darby & Cushman

[57] ABSTRACT

In a floppy disk drive, a disk driving mechanism is controlled by a disk drive controller so as to rotate a floppy disk for a predetermined time when the floppy disk is loaded into the disk drive. Thereby, dust adhering to the surface of the floppy disk can be removed with a cleaning liner in a cartridge containing the floppy disk. In addition, a magnetic head is brought into contact with a storage medium being stopped by the disk drive controller after dust adhering to the surface of the storage medium has been removed.

5 Claims, 4 Drawing Sheets

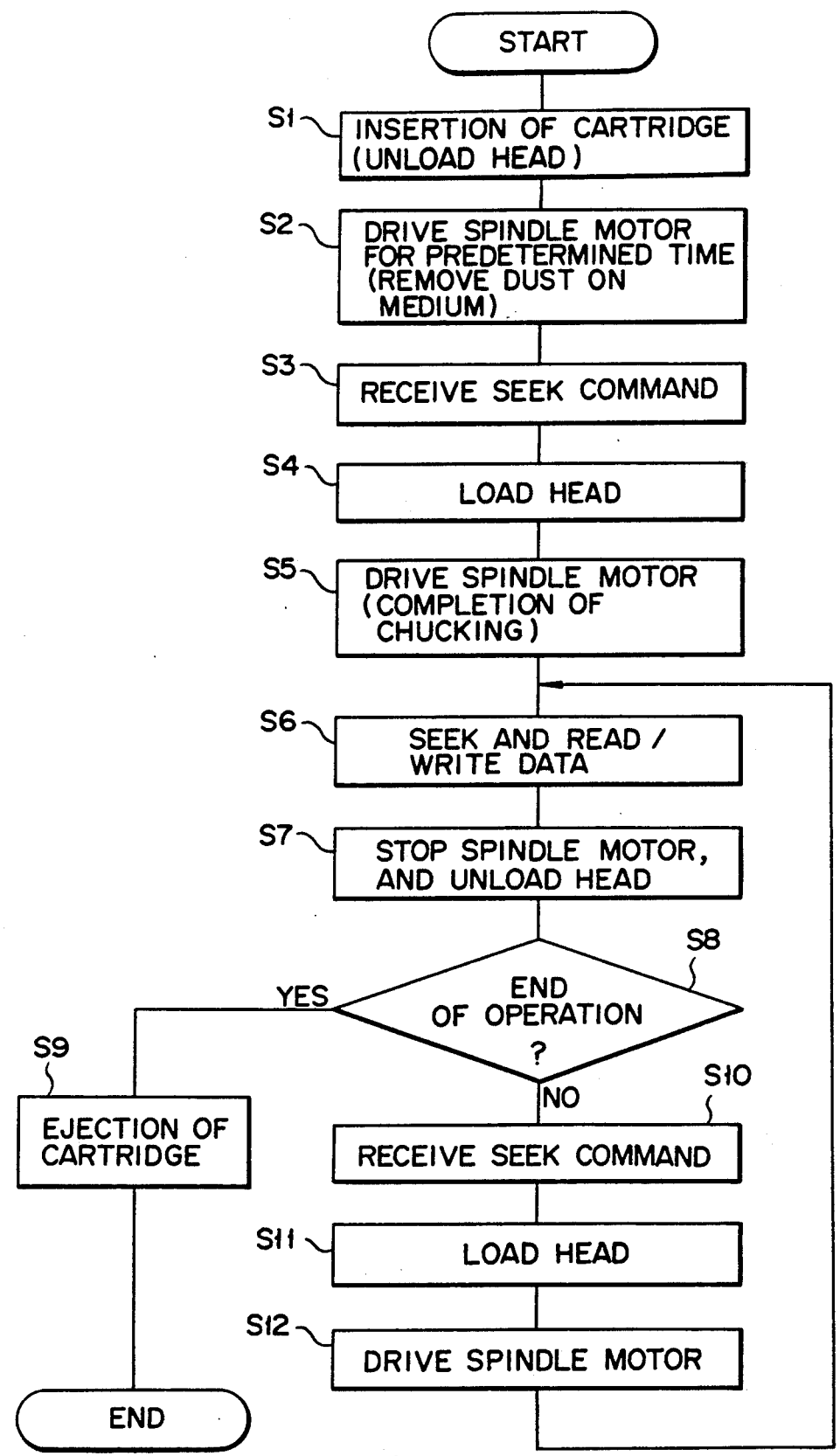
F I G. 3

DISK DRIVE AND METHOD FOR CONTROLLING THE CLEANING OF THE FLOPPY DISK

BACKGROUND OF THE INVENTION

1. Field of the Invention

The present invention relates to a drive control device for a floppy disk housed in a case provided with cleaning liners.

2. Description of the Related Art

Heretofore, with 3.5-inch floppy disk systems by way of example, storage mediums, that is, floppy disks, are housed in hard cases made of plastic. The case in which a disk is housed is usually called the cartridge. The storage medium is inserted into or ejected from a floppy disk drive (FDD) as it is housed in a case. The cartridge is provided with head windows through which a magnetic head can be brought into contact with the storage medium and shutters for closing the head windows.

Since such a storage medium is housed in a case, it is usually difficult for dust to adhere to the surface of the storage medium. But, a user might open the shutter of the cartridge by hand when it is not loaded into the disk drive. Dust might thus adhere to the storage medium in that event. When the cartridge is loaded into the disk drive, the shutter is opened by internal mechanisms. At this point, dust stirred up by vibration resulting from loading of the cartridge into the disk drive might adhere to the surfaces of the storage medium which are exposed in the head window areas.

Therefore, cartridges having inside cleaning liners which are in contact with both sides of the disk are used with conventional 3.5-inch floppy disk drives. Owing to the cleaning liner, the dust entering through the head window and adhering to the surface of the storage medium can be removed. It is because the storage medium rotates that the dust adhered to the surface of the storage medium can be removed by the cleaning liner.

When a storage medium is read from or written to, its center of rotation must always be held at the same point. For this reason, the storage medium is subjected to chucking when it is loaded in the disk drive. The chucking aligns two drive holes provided in the neighborhood of the center of the storage medium with two protrusions provided in the drive unit of the disk drive. In this case, the accurate chucking cannot be achieved unless two upper and lower magnetic heads are loaded and moderate friction between the disk and the heads occurs. Thus, the magnetic heads are loaded when the storage medium stops or does not rotate sufficiently immediately after the cartridge is loaded into the disk drive. That is, since the magnetic heads are loaded when dust adhering to the surface of the storage medium remains unremoved by the cleaning liners, a substantial pressure is applied to the dust. As a result, flaws might be produced in the storage medium, making its use impossible. Moreover, flaws might also be produced in the magnetic heads, thereby decreasing their life.

SUMMARY OF THE INVENTION

It is an object of the present invention to provide a magnetic disk drive control device which permits dust adhering to a storage medium to be effectively removed before magnetic heads are brought into contact with the storage medium and which permits the storage medium to be rotated accurately.

According to an aspect of the present invention, there is provided a disk drive for driving a storage device to rotate which is housed in a case provided with an internal cleaning liner comprising: disk driving means for rotating said storage medium; and control means for driving said disk driving means for a predetermined time in order to remove dust adhering to said storage medium with said cleaning liner when said storage medium housed in said case is loaded into said disk drive.

According to another aspect of the present invention, there is provided a control method for use with a floppy disk drive in which a storage medium housed in a case provided with an internal cleaning liner is driven to rotate by disk driving means and a magnetic head is brought into contact with said storage medium to read and write data, comprising the steps of: controlling said disk driving means so as to rotate said storage medium loaded into said floppy disk drive for a predetermined time, thereby removing dust adhering to said storage medium with said cleaning liner; and driving said storage medium so as to cause said storage medium to be completely chucked by said disk driving means after said magnetic head has been brought into contact with said storage medium being stopped.

According to the present invention, dust adhering to the surface of a storage medium can be effectively removed immediately after the storage medium has been loaded into a disk drive and thus a magnetic head can be brought into contact with the dust-free storage medium. In addition, in a preferred embodiment of the present invention, accurate chucking can be accomplished so that the center of rotation of the storage medium can always be set at the same point.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

These and other features of the present invention will become apparent in the following description of a preferred embodiment taken in conjunction with the accompanying drawings in which:

FIG. 3 is a flowchart useful for explaining the operation of the disk drive control device of FIG. 1.

DETAILED DESCRIPTION OF THE PREFERRED EMBODIMENTS

Figure 1:
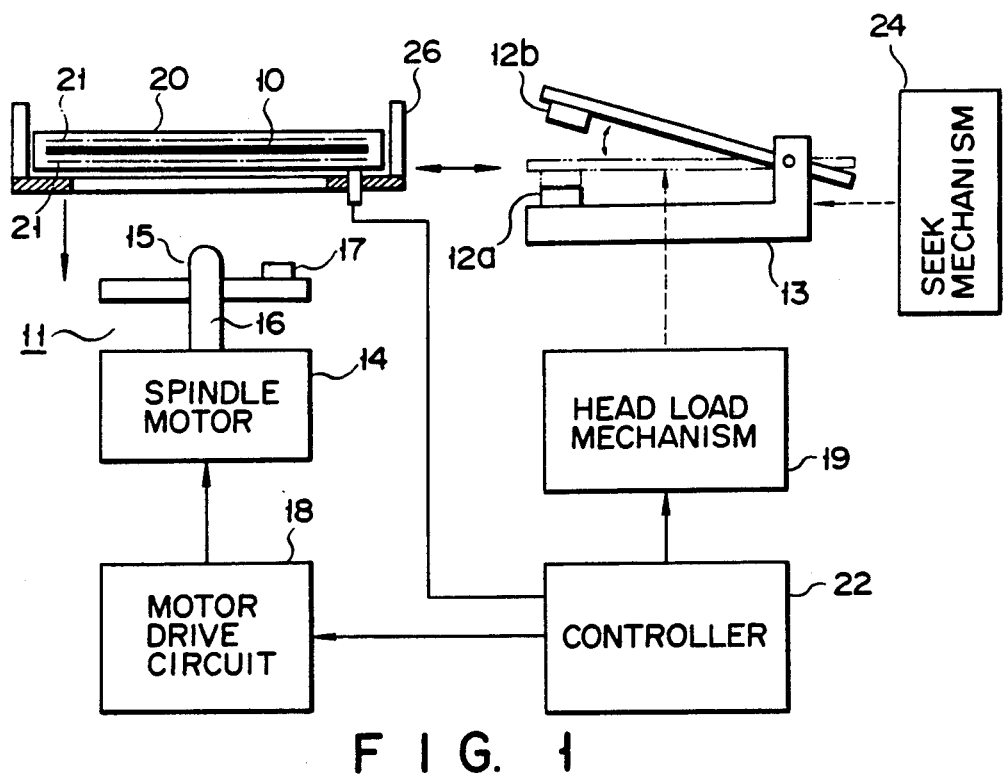
FIG. 1 is a block diagram of a disk drive control device embodying the present invention.

Referring now to FIG. 1, a floppy disk drive, which is adapted to 3.5-inch floppy disks, includes a disk drive mechanism 11 for rotating a storage medium or magnetic disk 10 and a carriage mechanism 13 carrying an S0 magnetic head 12a and an S1 magnetic head 12b. Disk drive mechanism 11 has a chucking unit 15 which holds storage medium 10 housed in a cartridge 20 loaded into the disk drive to transmit the torque of a spindle motor 14 to the storage medium. Chucking unit 15 has a central pin 16 and a drive pin 17. Spindle motor 14 is driven by a motor driving circuit 18.

Figure 2B:
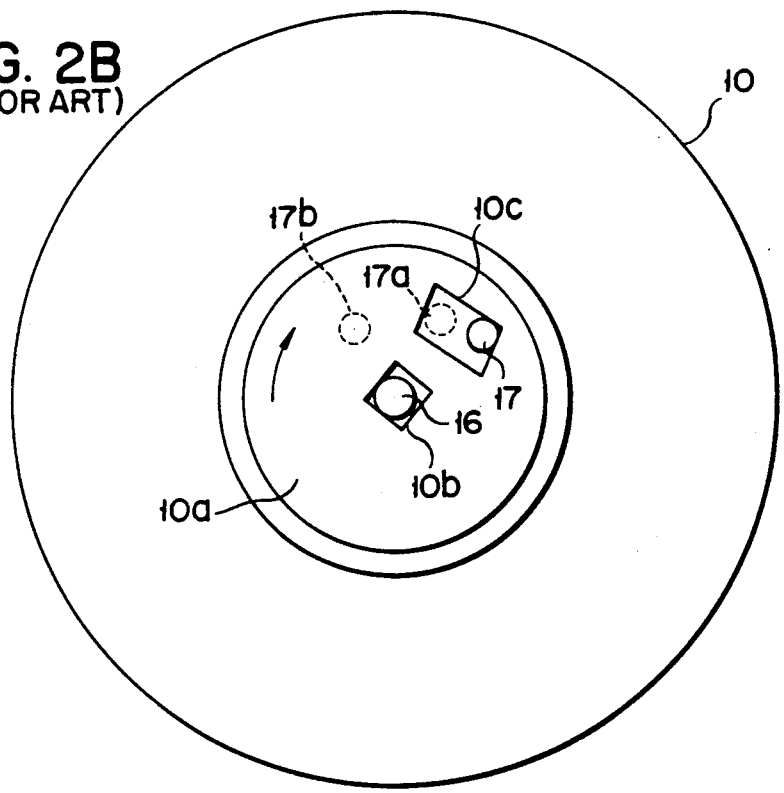
FIG. 2B is a plan view of a storage medium set in the disk drive control device of FIG. 1.
Figure 2A:
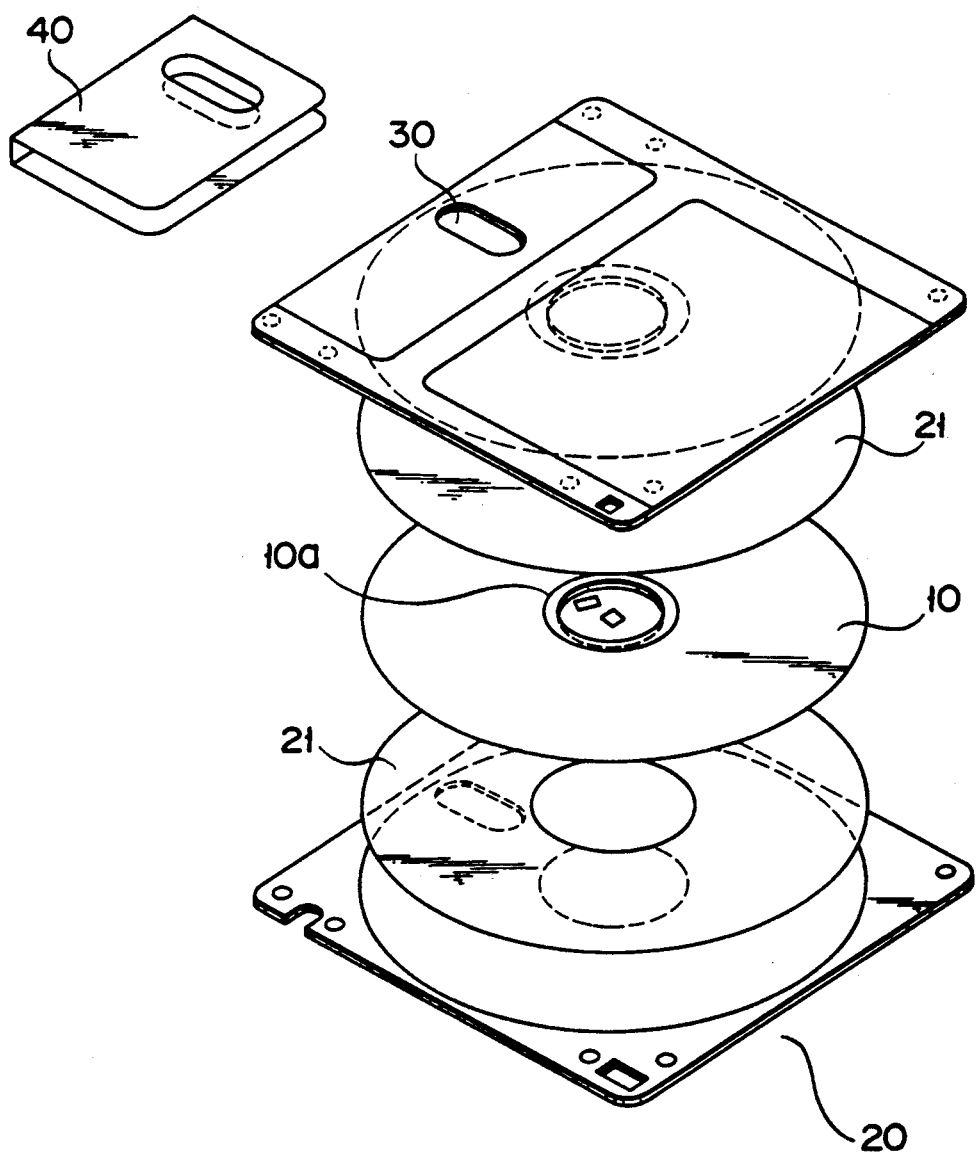
FIG. 2A is an exploded view showing the cartridge containing the storage medium.

Here, cartridge 20 has two upper and lower cleaning liners 21 as well as a storage medium 10 having both sides in contact with the liners 21 in a hard case made of plastics as shown in FIG. 2A. As shown in the plan view of FIG. 2B, storage medium 10 is provided with a hub 10a made of metal in the center thereof. Hub 10a is provided with a center hole 10b into which center pin 16 is to be inserted and a drive hole 10c into which drive pin 17 is to be inserted.

Carriage mechanism 13 is moved by a seek mechanism 24 using a motor such as a pulse motor along a radial line of the storage medium or disk 10 chucked by disk drive mechanism 11. As a result, each of heads 12a and 12b is allowed to seek a selected track on the disk. Each of heads 12a and 12b can be brought into contact with storage medium 10 through a head window 30 of cartridge 20, i.e., loaded by a head loading mechanism 19 using solenoids. Also, each of heads 12a and 12b is disengaged from storage medium 10, i.e., unloaded by head loading mechanism 19. Control circuit 22 controls of the floppy disk drive (FDD), that is, controls integral parts of the present invention comprising motor drive circuit 18, head load circuit 19 and seek mechanism 24.

Figure 4:
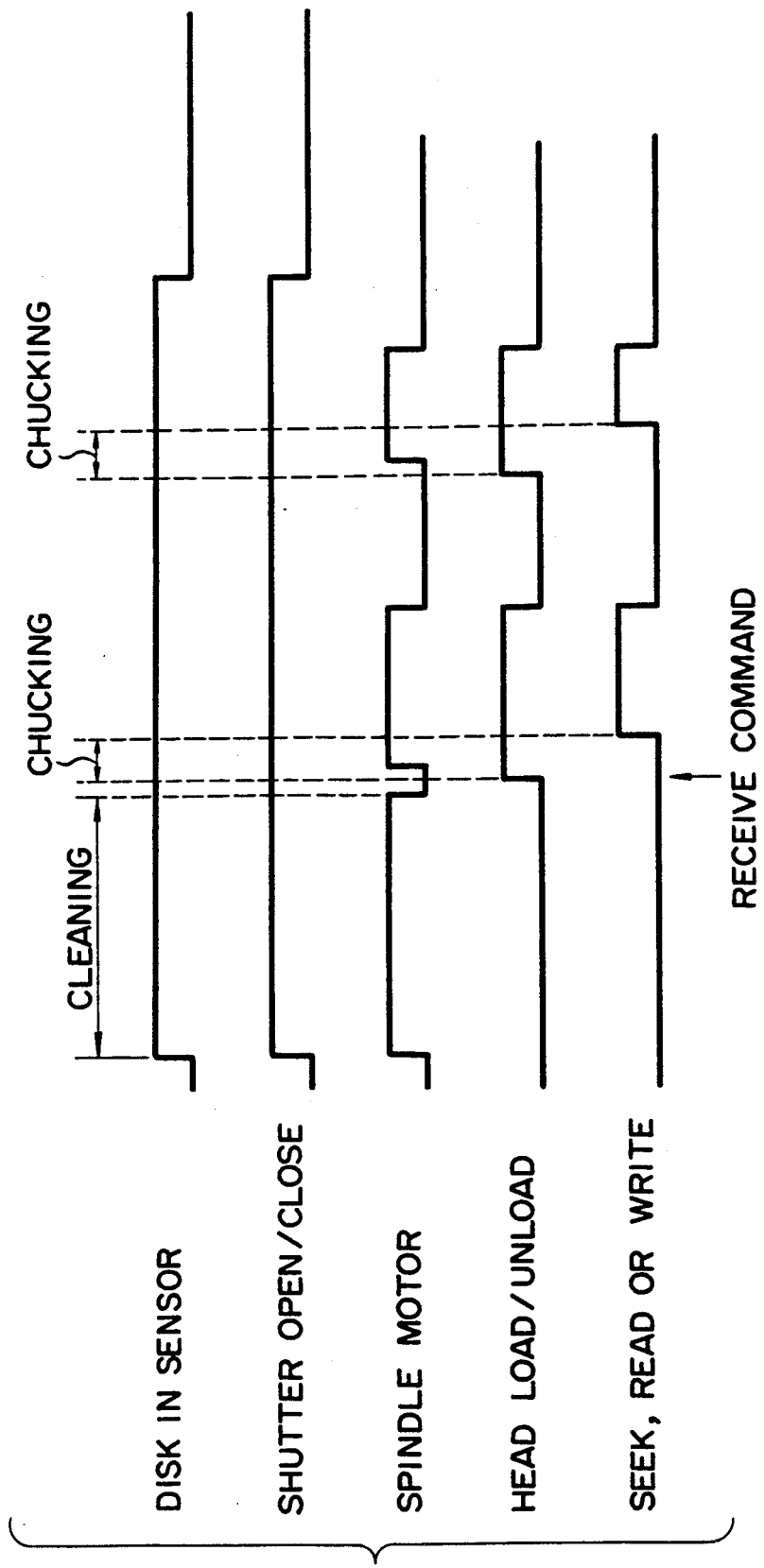
FIG. 4 is a timing diagram for explaining the operation of the disk drive control device of FIG. 1.

Hereinafter, the operation of the embodiment will be described with reference to FIGS. 3 and 4. FIG. 3 is a flowchart for explaining the operation of the invention and FIG. 4 is a timing diagram for explaining the opertion of the invention. First, as shown in FIG. 3, when cartridge 20 is loaded into the disk drive (step S1). the heads 12a and 12b are unloaded namely, removal from the storage medium 10, and the shutter 40 is opened and storage medium 10 descends toward disk drive mechanism 11. With 3.5-inch floppy disk drives, a receiver device 26 for holding cartridge 20 is provided, which descends toward disk drive mechanism 11. This is accomplished using driving force of a spring, for example. The floppy disk drive including further including a disk-in sensor (disk detector) 28. When cartridge 20 is loaded into the disk drive, a disk detection signal is output from the disk-in sensor to control circuit 22.

Responding to the disk detection signal, control circuit 22 controls motor drive circuit 18 to rotate spindle motor 14 for a predetermined time. Chucking unit 15 is thus rotated by spindle motor 14 with the result that storage medium 10 is temporarily chucked by chucking unit 15 to rotate. By rotating, storage medium 10 is rubbed by cleaning liners 21 in cartridge 20 to remove dust adhered to the surfaces thereof (step S2). This operation corresponds to the drawing legend "CLEANING" in FIG. 4.

Here it is to be noted that storage medium 10 has simply been chucked by chucking unit 15 temporarily and the complete alignment of the disk 10 and disk drive mechanism 11 has not been completed. That is, if disk drive mechanism 11 drives storage medium 10 when heads 12a and 12b are not brought into contact with storage medium 20, drive pin 17 may stay in the position 17a or 17b indicated by the dotted line as shown in FIG. 2B. In such a case, the relative positions of center holes 10b and 10c of cartridge 20 and center pin 16 and drive pin 17 of chucking unit 15 which are inserted into the holes are not set correctly.

When a seek command is input (step S3), heads 12a and 12b are brought into contact with the storage medium which is being stopped (step S4). Storage medium 10 is next driven to rotate (step S5). As a result, maximum frictional force is produced between heads 12a, 12b and storage medium 10 and between cleaning liner 21 and storage medium 10, thus increasing the load of disk drive mechanism 11 to a maximum. Thus, the relative positions of holes 10b and 10c of storage medium 10 and pins 16 and 17 of chucking unit 15 are set correctly. In this way the alignment is completed. This operation corresponds to the drawing legend "CHUCKING" in FIG. 4. Each of heads 12a and 12b seeks a track on storage medium 10 and reads data from or writes data on the track while contacting the storage medium (step S6).

When data read/write is terminated, control circuit 22 stops spindle motor 14 to disengage the heads from storage medium 10 (step S7).

If a seek command is still input, the operation shifts to step S10. When the operation is terminated, cartridge 20 is ejected from the floppy disk drive by operating an eject button (step S9).

In this way dust can be removed from storage medium 10 by driving it to rotate with heads 12a and 12b unloaded immediately after cartridge 20 is loaded into the floppy disk drive. Therefore, it becomes possible to avoid damage to the storage medium and the heads resulting from contact of the heads with dust adhering to the surfaces of the storage medium when the heads are brought into contact with the storage medium. In addition, the storage medium can accurately be aligned by disk drive mechanism 11 because the driving of storage medium 10 is restarted with heads 12a and 12b loaded.

Additional advantages and modifications will readily occur to those skilled in the art. Therefore, the invention in its broader aspects is not limited to the specific details, representative devices, shown and described. Accordingly, departures may be made from such details without departing from the spirit or scope of the general inventive concept as defined by the appended claims and their equivalents.

What is claimed is:

1. A disk drive for rotationally driving a data storage disk which has a center hole and a drive hole for driving and for aligning the disk, the disk being housed in a case provided with an internal cleaning liner, comprising:

a magnetic head for reading data from and writing data on said disk when the head is brought into contact with said disk;

means for moving the magnetic head;

disk driving means for rotating said disk, said disk driving means having a center pin and drive pin which are respectively inserted into said center hole and drive hole of said disk;

cleaning control means for driving said disk driving means for a predetermined time in order to remove dust adhering to said disk with said cleaning liner immediately after said disk housed in said case has been loaded into said disk drive, said cleaning control means stopping the drive of said disk by said disk driving means after said predetermined time has lapsed, the means for moving the magnetic head preventing the magnetic head from contacting said disk during said predetermined time; and control means for controlling said disk driving means to rotate said disk after said magnetic head has been brought into contact with said disk by said means for moving the magnetic head.

2. A disk drive according to claim 1, wherein the means for moving the magnetic head comprises:

head lowering means for contacting said magnetic head with said disk; and head unloading control means for controlling said head loading means to hold head said away from said disk from the time when said disk and case have been loaded into said disk drive until said predetermined time has lapsed.

3. A disk drive according to claim 1, wherein the means for moving the magnetic head comprises:

head loading means for contacting said magnetic head with said disk;

head loading control means for controlling said head loading means to move said magnetic head into contact with said disk after said disk has been rotated said predetermined time and has been stopped by said cleaning control means.

4. A disk drive for rotationally driving a data storage disk which has a center hole and a drive hole for driving and for aligning the disk, the disk being housed in a case provided with an internal cleaning liner which is in contact with the disk comprising:

disk driving means for rotating said disk, said disk driving means having a center pin and drive pin which are respectively inserted into said center hole and drive hole of said disk;

a magnetic head for reading data from the writing data on said disk when the head is brought into contact with said disk;

head loading means for contacting said magnetic head with said disk;

cleaning control means for driving said disk driving means for a predetermined time so as to remove dust adhering to said disk with said cleaning liner after said disk housed in said case has been loaded into said disk drive, said cleaning control means stopping the drive of said disk by said disk driving means after said predetermined time has lapsed;

head loading control means for controlling said head loading means to move said magnetic head into contact with said disk after said disk has been rotated said predetermined time and has been stopped by said cleaning control means; and control means for controlling said disk driving means to rotate said disk after said magnetic head has been brought into contact with said disk by said head loading control means.

5. A method for controlling a floppy disk drive in which a data storage disk having a center hole and a drive hole for driving and for aligning the disk, and which is housed in a case provided with an internal cleaning liner which is in contact with said disk, in which the disk is rotationally driven by disk driving means having a center pin and drive pin which are respectively inserted into said center hole and drive hole of said disk and in which a magnetic head is brought into contact with said disk to read and write data, said control method comprising the steps of:

controlling said disk driving means so as to rotate said disk for a predetermined time immediately after the disk is loaded into said disk drive, thereby removing dust adhering to said disk with said cleaning liner;

controlling said disk driving means so as to stop the rotation of said disk after said predetermined time has lapsed;

moving said magnetic head into contact with said disk after the rotation of said disk has been stopped; and rotating said disk with said disk driving means after said magnetic head has been brought into contact with said disk.

* * * * *